United States Patent [19]

Tajima et al.

[11] Patent Number: 4,634,624
[45] Date of Patent: Jan. 6, 1987

[54] COMBINED STRUCTURE COMPRISING PARTS HAVING DIFFERENT COEFFICIENTS OF THERMAL EXPANSION

[75] Inventors: Atsushi Tajima; Nobuo Suzuki, both of Fujisawa; Tsutomu Kuse, Odawara, all of Japan

[73] Assignee: Hitachi, Ltd., Tokyo, Japan

[21] Appl. No.: 829,825

[22] Filed: Feb. 18, 1986

[30] Foreign Application Priority Data

Feb. 28, 1985 [JP] Japan .................. 60-37443

[51] Int. Cl.$^4$ .............................................. B32B 7/02
[52] U.S. Cl. ................... 428/212; 428/912.2
[58] Field of Search ............... 428/212, 217, 218, 220, 428/912.2

[56] References Cited

U.S. PATENT DOCUMENTS 2,931,142  4/1960  Veres ................................ 428/212
3,424,642  1/1969  Orcutt ............................... 428/212
4,587,172  5/1986  Roy et al. ........................ 428/912.2

Primary Examiner—William J. Van Balen
Attorney, Agent, or Firm—Antonelli, Terry & Wands

[57] ABSTRACT

A combined structure includes a first member having at least a projection, e.g., a support, and a second member, e.g., an optical mirror, having a coefficient of thermal expansion different from that of the first member and combined cross-wise with the first member through a projection of the latter and by use of connecting members. One side wall surface of the projection of the first member and both side wall surfaces of the second member intersecting the former are bridge-connected by the connecting members at a height of a neutral plane of the second member which intersects the side wall surface of the projection of the first member. In case the first member has a plurality of projections, only those wall surfaces of the projections that face the same direction are bridge-connected to both side wall surfaces of the second member.

5 Claims, 11 Drawing Figures

COMBINED STRUCTURE COMPRISING PARTS HAVING DIFFERENT COEFFICIENTS OF THERMAL EXPANSION

BACKGROUND OF THE INVENTION

The present invention relates to a combined structure comprising parts of different coefficients of thermal expansion which may produce an adverse effect on the structure and, more particularly, to such type of structure that comprises a combination of an optical part (e.g., an optical mirror) of an optical device using a movable galvanic mirror and its support. The combined structure according to the present invention is of such nature that in case a structure part such as an optical mirror of which a comparatively high degree of flatness is required is combined with its support, no particular trouble takes place.

FIGS. 1 through 3 show a conventional combined structure comprising a plurality of parts having different coefficients of thermal expansion, which parts are combined with each other through connecting members.

The prior art technique shown in the above figures is that an optical part 3, such as a mirror, is placed on a reference surface 2 of a support 1 made of e.g., aluminum and connecting members 6, 7, 8 and 9 are applied to the corners formed between the side wall surfaces 4 and 5 of the optical part 3 and the reference surface 2 of the support 1 so that the part 3 is force-connected to the reference surface 2.

The prior art technique has had such disadvantages that when a stress $F_3$ is generated in the direction of the width of the optical part 3 in a low temperature atmosphere due to the difference in coefficient of thermal expansion between the support 1 and the optical part 3 as shown in FIG. 2, a bending moment $M_3$ is applied on the optical part 3, and when a stress $F_4$ is generated in the longitudinal direction of the part 3 as shown in FIG. 3, a bending moment is applied to the part 3. As a result, the optical part 3 deforms to become defocussed due to a torsional strain on the part 3.

A phenomenon of defocussing of the conventional optical part is shown in FIG. 4, which is a graph illustrating the relationship between the temperature and defocussing of the part 3.

As will be clear from FIG. 4, the amount of defocussing of the optical part 3 due to a tortional strain increases from around 15° C.

Further, other prior art techniques relating to a structure comprising a combination of parts having different coefficients of thermal expansion are disclosed in the Japanese Laid-open Patent Publication No. 52-50704 and in Japanese Laid-open Utility Model Publications Nos. 56-119147 and 57-33434.

However, countermeasures against the strain applied to a combined structure due to the difference in coefficient of thermal expansion between the parts forming the structure have not been taken so far.

SUMMARY OF THE INVENTION

The object of the present invention is to overcome the above-mentioned prior art problems and to provide a mechanism for connecting the parts of a combined structure having different coefficients of expansion so that the generation of strain in the structure due to temperature variations is prevented.

For achieving the above object, the present invention features that in a combined structure comprising a first part (e.g., a support) and a second part (e.g., an optical part) combined with the first part, the portions where both of the parts are connected together through connecting members are specifically selected.

Further, the invention additionally features that in case the first and second parts are combined with each other through the connecting members, the structure of both of the parts is specifically designed so that the connecting members are applied to the most effective portions of the parts thereby achieving the abovedescribed object of the present invention. Thus, with the above structure, it is possible to prevent the generation of torsional strain in the combined structure due to temperature variations.

BRIEF DESCRIPTION OF THE DRAWINGS

FIGS. 1 through 3 show an example of the prior art technique of which FIG. 1 is a perspective view of a combined structure in its entirety;

FIG. 2 is a sectional view of the structure shown in FIG. 1 especially when it is viewed from the direction of the arrow VIII;

FIG. 3 is a sectional view of the structure shown in FIG. 1 especially when it is viewed from the direction of the arrow IX.

Further.

DESCRIPTION OF PREFERRED EMBODIMENT

Figure 1:
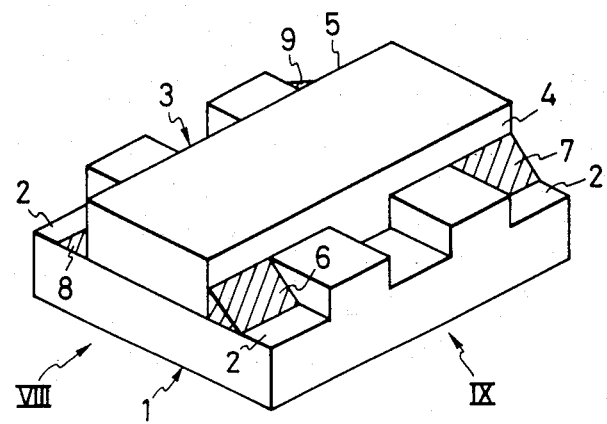
Figure 2:
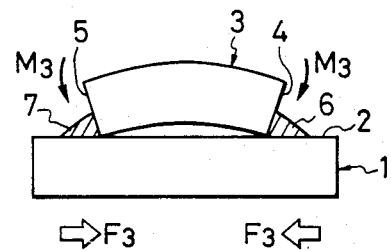
Figure 3:
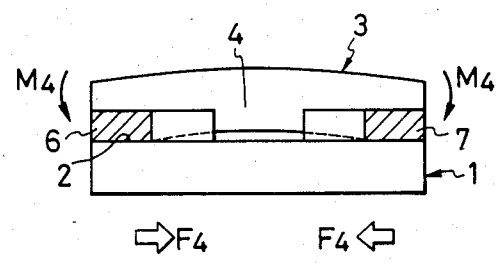
Figure 4:
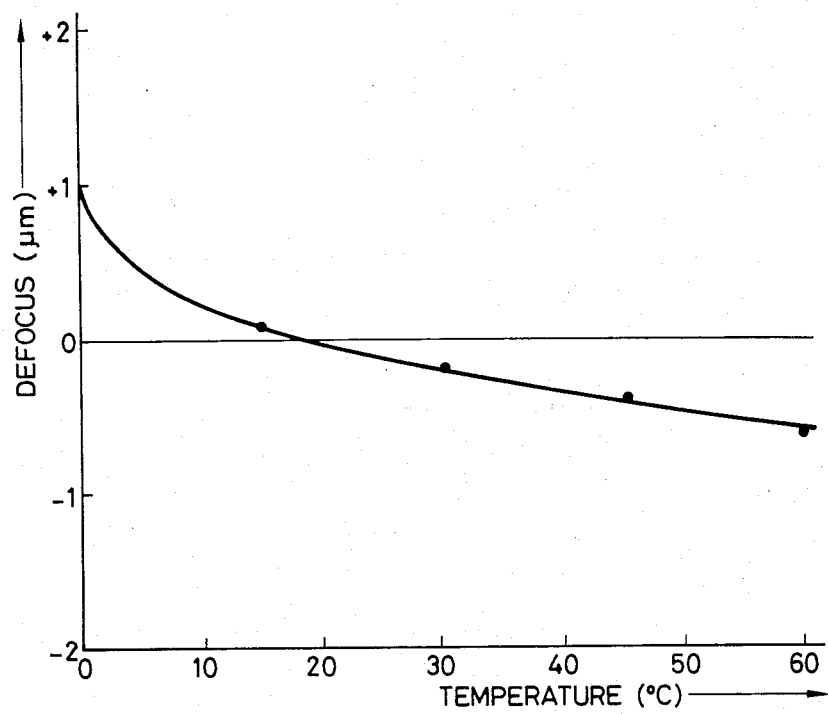
FIG. 4 is a graph showing the relationship between the temperature and the defocussing of an optical part.

One embodiment of the present invention will now be described with reference to the accompanying drawings.

FIGS. 5 through 8 show one embodiment of the present invention especially when it is applied to a tracking actuator (a movable galvanic mirror) of an optical disk head.

In the illustrated embodiment, a support 10 as a first part and an optical part 16 as a second part are connected to each other through connecting or bridge members 19, 20, 21 and 22 formed of a bonding material.

The support 10 is made of aluminum, for example. Further, the support 10 has a reference surface 11 which is provided with projections 12 and 13 formed substantially integral therewith and spaced apart from each other in the direction of axis of X—X'. At the intermediate portion of each of the projections 12 and 13 in the longitudinal direction, there is provided a cutout for facilitating the fabrication of the optical part into the support so that the optical part 16 is received and fixed between the projections 12 and 13.

The connecting members which form the bridges 19, 20, 21 and 22 may be made an elastic bond consisting of epoxy resin, rubber, silicon and etc. Further, the thickness of each connecting member is about 1 mm when, for example, the member is used for an optical part 16 of 2 mm thick.

The connecting members are applied to the corners, respectively, between side wall surfaces of the projections 12 and 13 which face the same direction (i.e., X-side) and both longitudinal side wall surfaces 17 and 18 of the optical part 16 at a height corresponding to substantially half the height (in this embodiment) of the side wall surface of the projection 12 (13) and to substantially half the height (in this embodiment) of the optical part 16, in a general sense, at the level of a neutral plane 160 designated by a dotted line, so that the support 10 and the optical part 16 are connected firmly by the bridges 19, 20, 21 and 22 in a fillet welding fashion.

Figure 8:
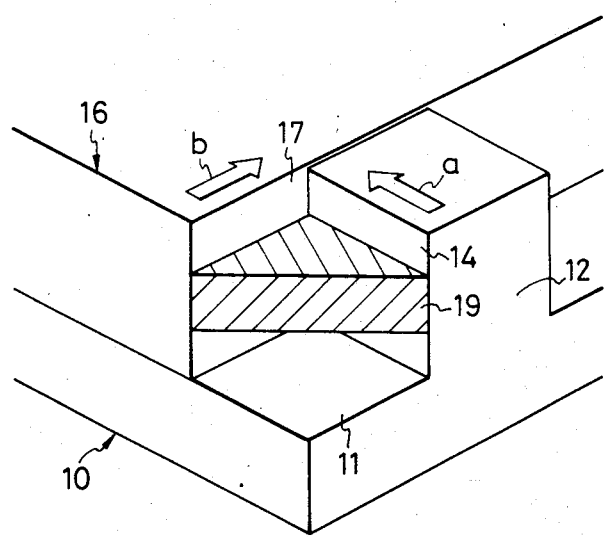
FIG. 8 is an enlarged perspective view of an essential portion of the embodiment shown in FIG. 5.

In FIG. 8, the arrows a and b designate directions of forces which are applied on the support 10 and the optical part 16, respectively, when the connecting members harden.

The mechanism of the structure as one embodiment of the present invention shown in FIGS. 5 through 8 comprises parts of different coefficients of thermal expansion and functions in the following manner.

That is, when stress $F_5$ is applied on the support 10 in the direction Y—Y, a compressive force is applied on the optical part 16 in the direction of the width thereof through the bridges 19, 20, 21 and 22. This compressive force acts on the neutral plane 160 (extending horizontally at a level corresponding to about half the height of the side wall surfaces 17 and 18 of the optical part 16 in the instant embodiment), in the direction normal to the surfaces 17 and 18.

Further, as the bridges 19 through 22 are formed of elastic bonding material, they have the function of absorbing and releasing the compressive force more effectively than aluminum, of which the support is made.

As a result, a bending moment which would otherwise force both shorter side ends of the optical part 16 toward the reference surface 11 of the support 10 is not generated thereby preventing the deformation of the optical part and therefore, the distortion of the optical part 16 due to the bending moment can be reduced to a considerable degree.

Figure 7:
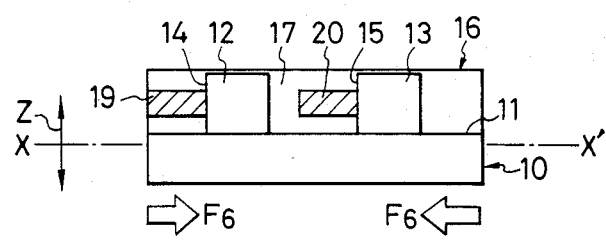
FIG. 7 is a sectional view of the embodiment shown in FIG. 5 especially when it is viewed from the arrow III.

Similarly, when stress $F_6$ is applied on the support 10 in the X—X' direction in a low temperature atmosphere as shown in FIG. 7, a compressive force acts on the optical part 16 in the longitudinal direction through the bridges 21 and 22. That is, it acts on the neutral plane 160 extending horizontally through the optical part 16 at a level corresponding to substantially half the height of the wall surfaces 17 and 18 and as the bridges 19, 20 and 21, 22 are secured only to the same side wall surfaces 14, 15 of the projections 12 and 13 of the support 10 on the X-side, it is possible to release the compressive force in one direction at the projections 12 and 13, with the additional advantage that the bridges 19 through 22 absorb and release the force to some degree.

Figure 5:
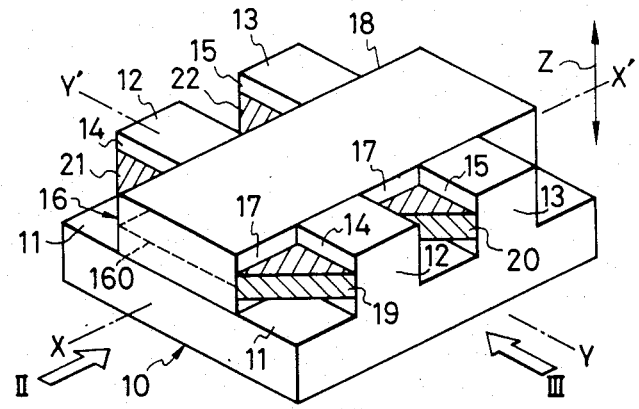
FIG. 5 is a perspective view of one embodiment of the present invention especially when it is applied to a tracking actuator of an optical disk head.
Figure 6:
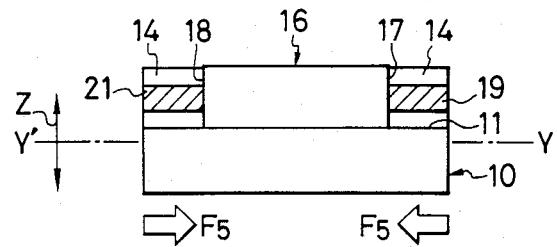
FIG. 6 is a sectional view of the embodiment shown in FIG. 5 especially when it is viewed from the direction of the arrow II.

Further, in FIG. 5, the support 10 and the optical part are not fixed to each other except at the portions where they are bridge connected to each other through the connecting members.

Thus, with the above structure of the present invention, the bending moment tending to force both the longitudinal side ends of the optical part 16 toward the reference surface 11 of the support 10 is not generated and the deformation of the optical part 16 due to the bending force is prevented, with the result that the tortional strain on the optical part 16 can be reduced to a remarkable degree.

Further, it is also possible to reduce to a great degree the distortion of the optical part 16 due to such bending moment not only in a low, but also high, temperature atmosphere.

Therefore, according to this embodiment, even when the difference in coefficient of thermal expansion is large and the temperature of the structure varies during use, the wave front aberration of the optical part is not influenced and the optical part 16 can be maintained in a high precision condition.

In addition, the fillet welding type application of the connecting members in the instant embodiment can reduce the space occupied by them and therefore, the entire structure can be effectively miniaturized.

Figure 9A:
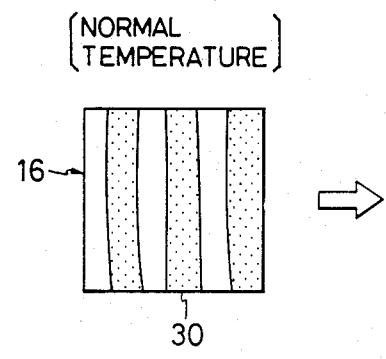
FIGS. 9(A) and 9(B) are views illustrating results of measurement of distortions in fringe spacing of an optical part at the time when the temperature of the optical part varies.
Figure 9B:
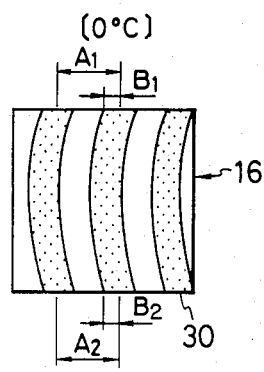

FIGS. 9 (A) and 9 (B) show results of measurement of distortions in fringe spacing of the optical part 16 due to a change in temperature.

In FIG. 9 (B), if $A_1$ is the pitch between adjoining distortions 30 in fringe spacing on one side of the optical part 16; $A_2$ is the pitch between the adjoining distortions in fringe spacing on the other side; $B_1$ is the displacement at one end of each distortion 30 in fringe spacing; and $B_2$ is the displacement at the other end of the distortion in the fringe spacing D, the following equation will be established:

$$D = \frac{\frac{(B_1 + B_2)}{2}}{\frac{(A_1 + A_2)}{2}}.$$

According to the results of experiments conducted by the present inventors, it has been found that it is possible to control the amount of distortion 30 in fringe spacing by about 1/10 at normal temperature and by about 1/5 at a temperature of 0° C.

Figure 10:
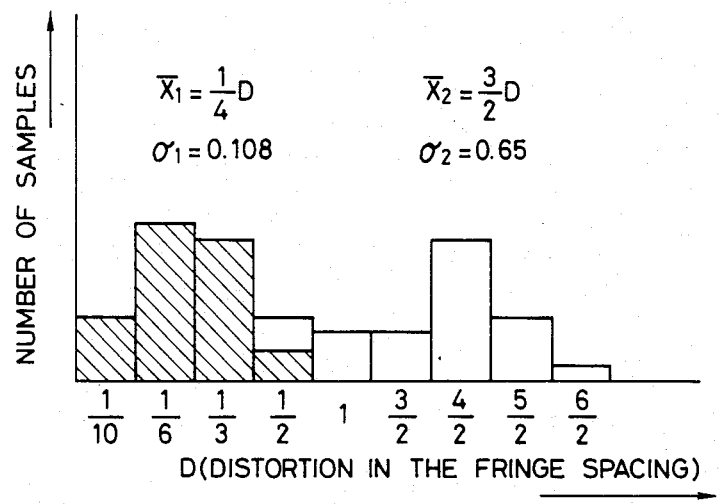
FIG. 10 is a bar graph showing distributions of the amounts of distortion in the fringe spacing of the combined structure according to the present invention and that according to the prior art technique.

FIG. 10 is a bar graph showing a distribution of the amount of bending of distortion in fringe spacing of the combined structure according to the present invention and that of the amount of bending of distortion of an optical part according to the prior art technique. In this graph, the hatched portions designate combined structures according to the present invention and the non-hatched portions designate optical parts according to the prior art technique.

In FIG. 10, $\overline{X}_1$ designates the average value of the amount $X_1$ of bending of distortion in the fringe spacing of an optical part (a mirror) having the combined structure according to the present invention; $\sigma_1$ designates a standard difference value ($3\sigma$) of the same; $\overline{X}_2$ designates the average value of the amount $X_2$ of bending of distortion in the fringe spacing with respect to the optical part (a mirror) according to the prior art technique; and $\sigma_2$ designates a reference value of the same.

From the above figure, it will be understood that the amount of bending of distortion in fringe spacing of the combined structure according to the present invention is smaller than the structure according to the prior art technique.

It is of course natural that the present invention is applicable not only to the connection of an optical part to another part but also to structures in general each comprising more than three parts having different coefficients of thermal expansion.

In the foregoing description we have explained a case in which the bridges 19 through 22 are applied across the corners formed between one side wall surface 14 (15) of the projection 12 (13) and both side wall surfaces 17 and 18 of the optical part 16 at a height at which the neutral plane 160 extending horizontally between the wall surfaces 17 and 18 and intersecting at right angles to the side wall surface 14 (15) of the projection 12 (13) coincides with the central horizontal line dividing the height or thickness of each bridge into halves. However, it should be noted that the height at which each of the bridges is applied is not always limited thereto.

Further, it should also be noted that although the first structure part in the above-described embodiment is convex-concave in configuration, the present invention is not always limited thereto, and various alternations or deformations, such as an L-shaped structure and another structure having a projection part, can be made possible with respect to the shape and structure of the part, provided that the first and second structure parts are combined crosswise and the bonding material is applied to the combined parts to secure both parts firmly in a bridge-like fashion.

What is claimed is:

1. A combined structure comprising parts having different coefficients of thermal expansion comprising:
    a first structural part having at least a projection part on a surface thereof;
    a second structural part having a coefficient of thermal expansion different from that of the first structural part and which is capable of being combined with the first structural part through the projection part; and
    elastic connecting members positioned to connect the side wall surface of said first structural part and the side wall surface of said second structural part at a level of a neutral plane of said second structural part, so that said first structural part and said second structural part are firmly connected to each other.

2. A combined structure according to claim 1, wherein said first structural part is provided with a plurality of projections and the side wall surfaces of said first structural part facing the same direction and the side walls of said second part are bridge-connected through said connecting members.

3. A combined structure according to claim 1, wherein said first structural part and said second structural part are fixed to each other only at the portions where they are bridge-connected to each other through said connecting members.

4. A combined structure according to claim 1, in which said elastic connecting members bridge-connect said side wall surfaces of said first and said second structural parts in a fillet welding fashion.

5. A combined structure comprising parts having different coefficients of thermal expansion comprising:
    a first structural part having at least one projection part on a surface thereof;
    a second structural part having a coefficient of thermal expansion different from that of the first structural part and which is caspable of being combined with the first structural part through the projection part; and
    elastic connecting members positioned to connect a side wall surface of said first structural part and a side wall surface of said second structure part at a level of substantially half the height of said second structural part, so that said first structural part and said second structural part are firmly connected to each other.

* * * * *